United States Patent
Chung (10) Patent No.: US 11,995,297 B2
(45) Date of Patent: May 28, 2024

(54) ENHANCED USER INTERFACE (UI) BUTTON CONTROL FOR MOBILE APPLICATIONS

(71) Applicant: Samsung Electronics Co., Ltd., Suwon-si (KR)

(72) Inventor: Doohyun Chung, Basking Ridge, NJ (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/195,299

(22) Filed: Mar. 8, 2021

(65) Prior Publication Data

US 2022/0283694 A1    Sep. 8, 2022

(51) Int. Cl.
| | |
|---|---|
| G06F 3/04842 | (2022.01) |
| G06F 3/0481 | (2022.01) |
| G06F 3/0488 | (2022.01) |
| G06F 3/16 | (2006.01) |

(52) U.S. Cl.
CPC ........ G06F 3/04842 (2013.01); G06F 3/0481 (2013.01); G06F 3/0488 (2013.01); G06F 3/167 (2013.01)

(58) Field of Classification Search
CPC .. G06F 3/04842; G06F 3/0481; G06F 3/0488; G06F 3/167; G06F 3/16; G06F 3/0484; G06F 3/048

See application file for complete search history.

(56) References Cited

U.S. PATENT DOCUMENTS

| | | | | |
|---|---|---|---|---|
| 6,956,562 B1 * | 10/2005 | O'Hara | ............... | G06F 3/04883 345/173 |
| 7,080,014 B2 * | 7/2006 | Bush | ...................... | G06F 3/167 704/275 |
| 7,558,600 B2 * | 7/2009 | Kang | .................. | G06F 3/04883 455/418 |
| 8,478,349 B2 | 7/2013 | Seo et al. | | |
| 8,533,741 B2 * | 9/2013 | Jogand-Coulomb | ... | G06F 9/445 719/313 |

(Continued)

FOREIGN PATENT DOCUMENTS

| | | |
|---|---|---|
| JP | 2020-150296 A | 9/2020 |
| KR | 10-2009-0022465 A | 3/2009 |

(Continued)

OTHER PUBLICATIONS

International Search Report and Written Opinion of the International Searching Authority regarding International Patent Application No. PCT/KR2022/003294 dated Jun. 8, 2022, 9 pages.

*Primary Examiner* — Stella Higgs (57) ABSTRACT

An electronic device includes a display and at least one processor operatively connected to the display. The at least one processor is configured to receive a request to modify how to select an interactive element that is displayed at a first location on the display. The interactive element is configured to launch an operation when selected. The at least one processor is also configured to associate an input mechanism with the interactive element for launching the operation based on the request. The at least one processor is further configured to perform the operation associated with the interactive element in response to receiving the input mechanism.

20 Claims, 5 Drawing Sheets

(56) References Cited

U.S. PATENT DOCUMENTS

| | | | | |
|---|---|---|---|---|
| 8,565,830 | B2* | 10/2013 | Cho | G06F 3/0488 455/566 |
| 8,627,235 | B2* | 1/2014 | Chang | G06F 3/04883 345/173 |
| 8,793,606 | B2* | 7/2014 | Kim | G06F 3/04817 715/769 |
| 8,854,299 | B2* | 10/2014 | Bender | H04M 1/72403 715/863 |
| 9,021,398 | B2* | 4/2015 | Kotler | G06F 3/04812 715/834 |
| 9,021,402 | B1* | 4/2015 | Li | G06F 3/04883 715/863 |
| 9,104,308 | B2* | 8/2015 | Au | G06F 3/04883 |
| 9,116,602 | B2* | 8/2015 | Kotler | G06F 3/0482 |
| 9,261,985 | B2* | 2/2016 | Hicks | G06F 3/0485 |
| 9,401,159 | B2* | 7/2016 | Gustafsson | G10L 21/16 |
| 9,417,793 | B2* | 8/2016 | Kay | G06F 3/04842 |
| 9,483,160 | B2* | 11/2016 | Jung | G06F 3/04817 |
| 9,577,902 | B2* | 2/2017 | Grover | B60K 35/00 |
| 9,600,169 | B2* | 3/2017 | de Sa | G06F 3/167 |
| 9,905,226 | B2* | 2/2018 | Bishop | G06F 3/167 |
| 10,037,130 | B2* | 7/2018 | Cho | G06F 3/04883 |
| 10,055,101 | B2* | 8/2018 | Namgung | G06F 3/0488 |
| 10,140,014 | B2* | 11/2018 | Oh | G06F 3/041 |
| 10,222,963 | B2* | 3/2019 | Jung | G06F 3/0488 |
| 10,452,231 | B2* | 10/2019 | Akiner | G06F 3/0482 |
| 10,540,976 | B2* | 1/2020 | Van Os | G06F 3/167 |
| 11,199,906 | B1* | 12/2021 | Curtis | G06F 1/1626 |
| 11,237,635 | B2* | 2/2022 | Forsland | G06F 1/163 |
| 11,314,371 | B2* | 4/2022 | Jung | G06F 3/04883 |
| 2004/0128137 | A1* | 7/2004 | Bush | G06F 3/167 704/275 |
| 2004/0145574 | A1* | 7/2004 | Xin | G06F 3/0488 345/173 |
| 2005/0212767 | A1* | 9/2005 | Marvit | G06F 3/0346 345/158 |
| 2006/0085767 | A1* | 4/2006 | Hinckley | G06F 3/04883 715/863 |
| 2006/0155546 | A1* | 7/2006 | Gupta | G06F 9/451 704/275 |
| 2007/0124507 | A1* | 5/2007 | Gurram | G06F 3/167 704/E15.044 |
| 2007/0177804 | A1* | 8/2007 | Elias | G06F 3/04883 382/188 |
| 2010/0315358 | A1* | 12/2010 | Chang | G06F 3/04883 345/173 |
| 2011/0035691 | A1* | 2/2011 | Kim | G06F 3/04817 715/765 |
| 2012/0030623 | A1 | 2/2012 | Hoellworth | |
| 2012/0151420 | A1* | 6/2012 | Amento | G06F 3/017 715/863 |
| 2012/0304084 | A1 | 11/2012 | Kim et al. | |
| 2013/0050109 | A1 | 2/2013 | Ban | |
| 2013/0207901 | A1 | 8/2013 | Blants et al. | |
| 2013/0219277 | A1* | 8/2013 | Wang | G06F 3/167 715/728 |
| 2013/0321314 | A1* | 12/2013 | Oh | G06F 3/04817 345/173 |
| 2014/0033135 | A1* | 1/2014 | Lorenz | G06F 3/0486 715/863 |
| 2014/0096055 | A1* | 4/2014 | Jung | G06F 3/04845 715/769 |
| 2014/0195250 | A1* | 7/2014 | Gustafsson | G10L 21/16 704/275 |
| 2014/0325360 | A1* | 10/2014 | Jung | G06F 3/04883 715/728 |
| 2015/0033164 | A1* | 1/2015 | Jung | G06F 3/04883 715/765 |
| 2016/0110094 | A1* | 4/2016 | Kim | G06F 3/14 715/846 |
| 2016/0275949 | A1* | 9/2016 | Bishop | G10L 15/063 |
| 2017/0060391 | A1* | 3/2017 | Jun | G06F 3/0482 |
| 2017/0177383 | A1* | 6/2017 | Sa | G06F 3/0488 |
| 2018/0011630 | A1* | 1/2018 | Kim | G06F 3/0482 |
| 2019/0347916 | A1* | 11/2019 | Wild | H04L 67/2823 |

FOREIGN PATENT DOCUMENTS

| | | |
|---|---|---|
| KR | 10-2009-0063455 A | 6/2009 |
| KR | 10-1279518 B1 | 6/2013 |
| KR | 1020150081140 A | 7/2015 |
| KR | 10-2015-0090698 A | 8/2015 |
| KR | 1020160079367 A | 7/2016 |
| KR | 101746543 B1 | 6/2017 |
| KR | 10-2038147 B1 | 10/2019 |

\* cited by examiner

FIG. 4

ENHANCED USER INTERFACE (UI) BUTTON CONTROL FOR MOBILE APPLICATIONS

TECHNICAL FIELD

This disclosure relates generally to graphical user interfaces. More specifically, this disclosure relates to enhanced user interface (UI) button control for mobile applications on an electronic device.

BACKGROUND

The use of portable electronic devices has greatly expanded largely due to their usability, convenience, computing power, and the like. For example, some portable electronic devices support functions such as digital media playback, game play, electronic book (e-book) reading, digital image capture, phone communications, calendar scheduling, wireless communications, and Internet searching. A portable electronic device often includes a user interface (UI), such as a graphical user interface (GUI), that provides interactive elements allowing a user to view information and interact with the electronic device.

A portable electronic device can also include a user input device, such as a touchscreen panel, that can be used in combination with a graphical user interface. For example, if a user touches text, a graphic, or an icon displayed on the touchscreen with his or her finger or a stylus, the electronic device can detect the selection based on the location, situation, and type of touch. A portable electronic device can be of a shape and size that enables a user to both carry and provide inputs using a single hand. As such, a user could find it difficult to both hold the portable electronic device and provide a touch input to select a certain element that is displayed at a certain location on the touchscreen.

SUMMARY

This disclosure relates to enhanced user interface (UI) button control for mobile applications.

In a first embodiment, a method includes receiving a request to modify how to select an interactive element that is displayed at a first location on a display of an electronic device. The interactive element is configured to launch an operation when selected. The method also includes associating an input mechanism with the interactive element for launching the operation based on the request. The method further includes performing the operation associated with the interactive element in response to receiving the input mechanism.

In a second embodiment, an electronic device includes a display and at least one processor operatively connected to the display. The at least one processor is configured to receive a request to modify how to select an interactive element that is displayed at a first location on the display. The interactive element is configured to launch an operation when selected. The at least one processor is also configured to associate an input mechanism with the interactive element for launching the operation based on the request. The at least one processor is further configured to perform the operation associated with the interactive element in response to receiving the input mechanism.

In a third embodiment, a non-transitory machine-readable medium contains instructions that when executed cause at least one processor of an electronic device to receive a request to modify how to select an interactive element that is displayed at a first location on a display of the electronic device. The interactive element is configured to launch an operation when selected. The medium also contains instructions that when executed cause the at least one processor to associate an input mechanism with the interactive element for launching the operation based on the request. The medium further contains instructions that when executed cause the at least one processor to perform the operation associated with the interactive element in response to receiving the input mechanism.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" in accordance with this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

As noted above, an electronic device may include a user input device, such as a touchscreen panel, that can be used in combination with a graphical user interface. For example, if a user touches text, a graphic, or an icon displayed on the touchscreen with his or her finger or a stylus, the electronic device can detect the selection based on the location, situation, and type of touch. An electronic device can be of a shape and size that enables a user to both carry and provide inputs using a single hand. As such, a user could find it difficult to both hold the electronic device and provide a touch input to select a certain element that is displayed at a certain location on the touchscreen.

Interactive elements can include buttons (including "hard" and/or "soft" buttons), regions for text input, check boxes, and the like. Some interactive elements, when clicked or otherwise selected, may allow a user to perform one or more actions that correspond to the parameters of the interactive elements. For example, an interactive element representing a button could include an icon that when selected (such as by a touch input) causes an electronic device to execute a corresponding application. As another example, an interactive element may represent multiple buttons (such as in a calculator or phone application) that when selected (such as by a touch input) causes an electronic device to display a corresponding number on a display. As yet another example, an interactive element may represent a region for text input such that, when the region is selected (such as by a touch input), the electronic device (i) inquires as to whether a certain portion of the text is to be selected and/or copied or (ii) displays a keyboard and then displays new characters within the region in response to receiving additional inputs via the keyboard.

In some embodiments, different types of displayed elements may be related to text, such as a text input or a text view. A text input is a region of a GUI that includes editable text. A touch input can be received within a text input region for adding, removing, or editing the text within the text input region. For example, a text input region can include one or more areas that receive text, such as a user identification (ID), a password, an address, and the like. A text view is a region of a GUI that includes non-editable text. A touch input may be disabled within a text view region. A possible distinguishing characteristic between a region for text input and a region for text view is whether a predefined action or operation is performed when a touch input is received in the region.

When an electronic device includes a physical input device, such as a physical keyboard, various applications can provide convenient key mapping functions like keyboard shortcuts. However, some electronic devices may not have certain physical input devices (such as when an electronic device includes a touchscreen display) and therefore lack various shortcut buttons provided by a keyboard. When an electronic device does not include a physical input device, a user may physically touch a touchscreen or use a stylus with the touchscreen in order to select an interactive element. Unfortunately, when the electronic device includes a touchscreen but lacks a physical input device, a user may have difficulty touching a displayed interactive element based on the location and/or size of the interactive element. For example, when an electronic device is a handheld device that is held in the right hand of a user, the user may have difficulty touching an interactive element that is positioned on the left side of the display. Similarly, when an electronic device is a handheld device that is held in the left hand of a user, the user may have difficulty touching an interactive element that is positioned on the right side of the display.

The sizes and positions of interactive elements presented on a display of an electronic device are typically defined by a designer of an application or device's operating system. The sizes and positions of the interactive elements are often established in order to optimize usability of an application. However, the size of an interactive element may be too small for some users, which creates difficulty for the user when attempting to select the interactive element. Similarly, the position of an interactive element may make it difficult for some users to select the interactive element based on the displayed location of the interactive element on the display.

This disclosure describes various control mechanisms that allow a user to map additional touch areas to an interactive element, as well as to map a voice command to an interactive element. For example, when a user can select a portion of a display that is mapped to an interactive element, an operation associated with the interactive element can be launched as if the user actually selected the corresponding interactive element. Similarly, when a user verbally speaks a voice input, an operation associated with the interactive element can be launched when the voice input matches or is similar to a previously-mapped voice command.

Figure 1:
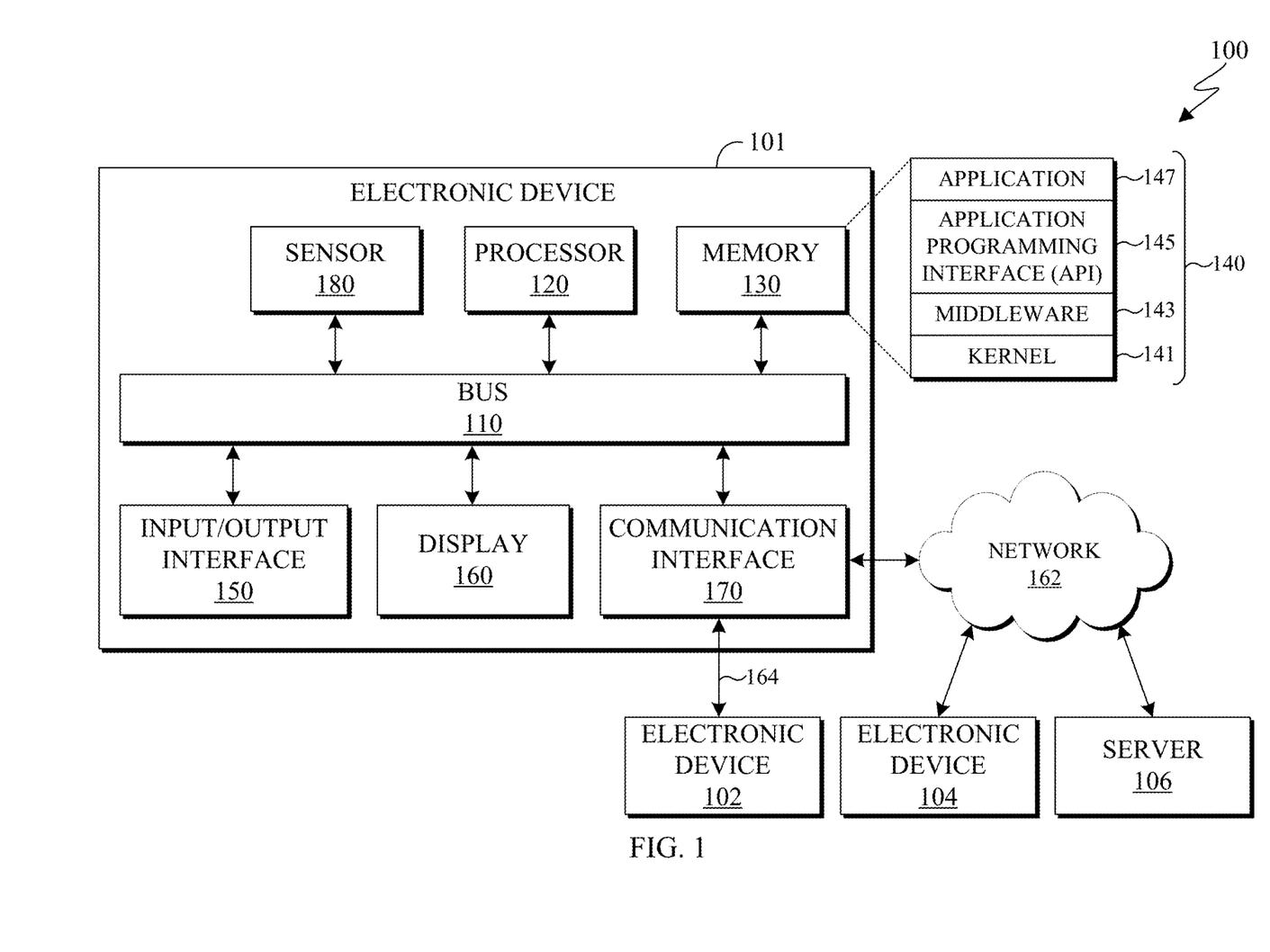
FIG. 1 illustrates an example network configuration including an electronic device in accordance with this disclosure.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170 and sensors 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), an application processor (AP), or a communication processor (CP). The processor 120 is able to perform control on at least one of the other components of the electronic device 101 and/or perform an operation or data processing relating to communication. In some embodiments, the processor 120 can be a graphics processor unit (GPU). Among other things, the processor 120 can associate one or more input mechanisms with an interactive element that is displayed on the display 160, thereby providing at least one additional way to launch an operation associated with the electronic device 101.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may include one or more applications for associating one or more input mechanisms with one or more interactive elements as discussed below. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device. For example, the I/O interface 150 can transfer data representing an input (such as a voice input, a touch input, and the like) to one or more other components of the electronic device 101.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, symbols, or interactive elements) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The electronic device 101 further includes one or more sensors 180 that can meter a physical quantity or detect an activation state of the electronic device 101 and convert metered or detected information into an electrical signal. For example, one or more sensors 180 can include one or more buttons for touch input, one or more cameras, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a biophysical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can also include an inertial measurement unit, which can include one or more accelerometers, gyroscopes, and other components. The sensor(s) 180 can further include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 includes at least one communication network, such as a computer network (like a local area network (LAN) or wide area network (WAN)), Internet, or a telephone network.

The first and second external electronic devices 102 and 104 and server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162, the electronic device 101 may be independently operated without a separate communication function according to some embodiments of this disclosure.

The server 106 can optionally support the electronic device 101 by performing or supporting at least one of the operations (or functions) implemented on the electronic device 101. For example, the server 106 can include a processing module or processor that may support the processor 120 implemented in the electronic device 101. In some embodiments, the server 106 may include one or more applications for associating one or more input mechanisms with one or more interactive elements as discussed below.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2A:
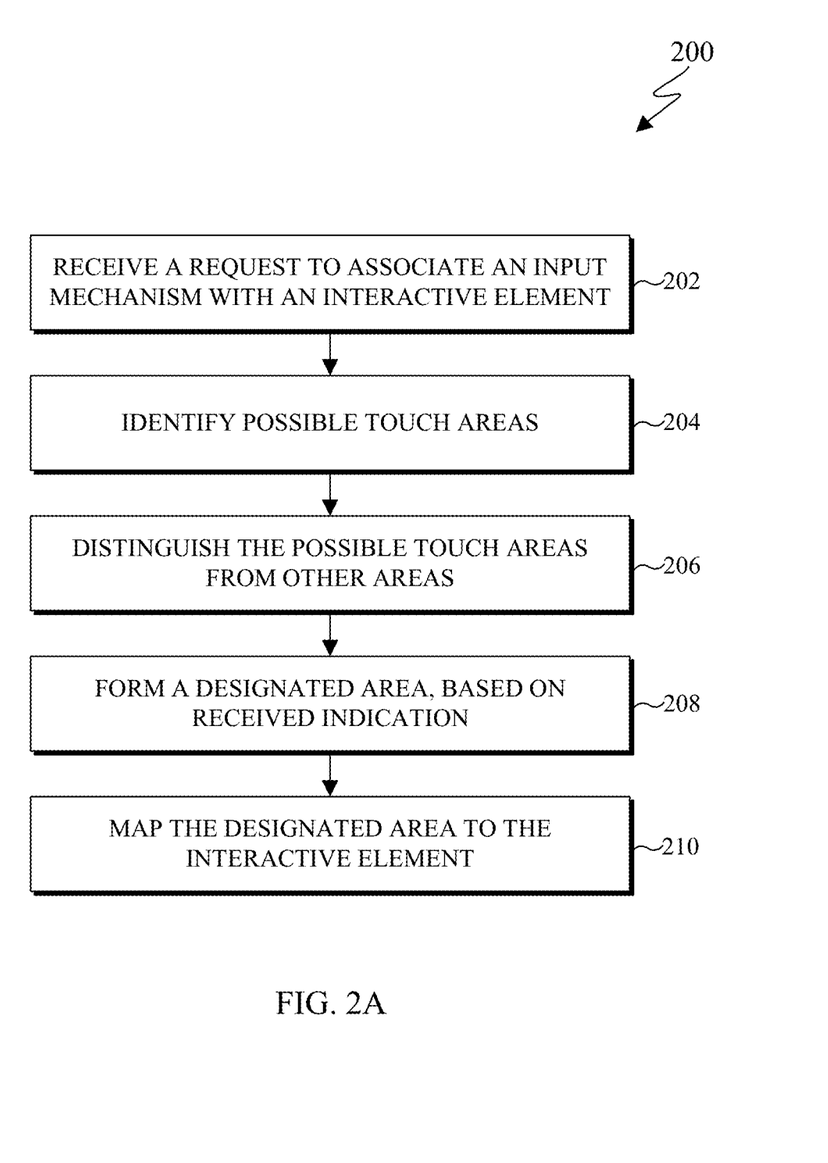
FIG. 2A illustrates an example process for associating an input mechanism representing a touch input with an interactive element in accordance with this disclosure.
Figure 2B:
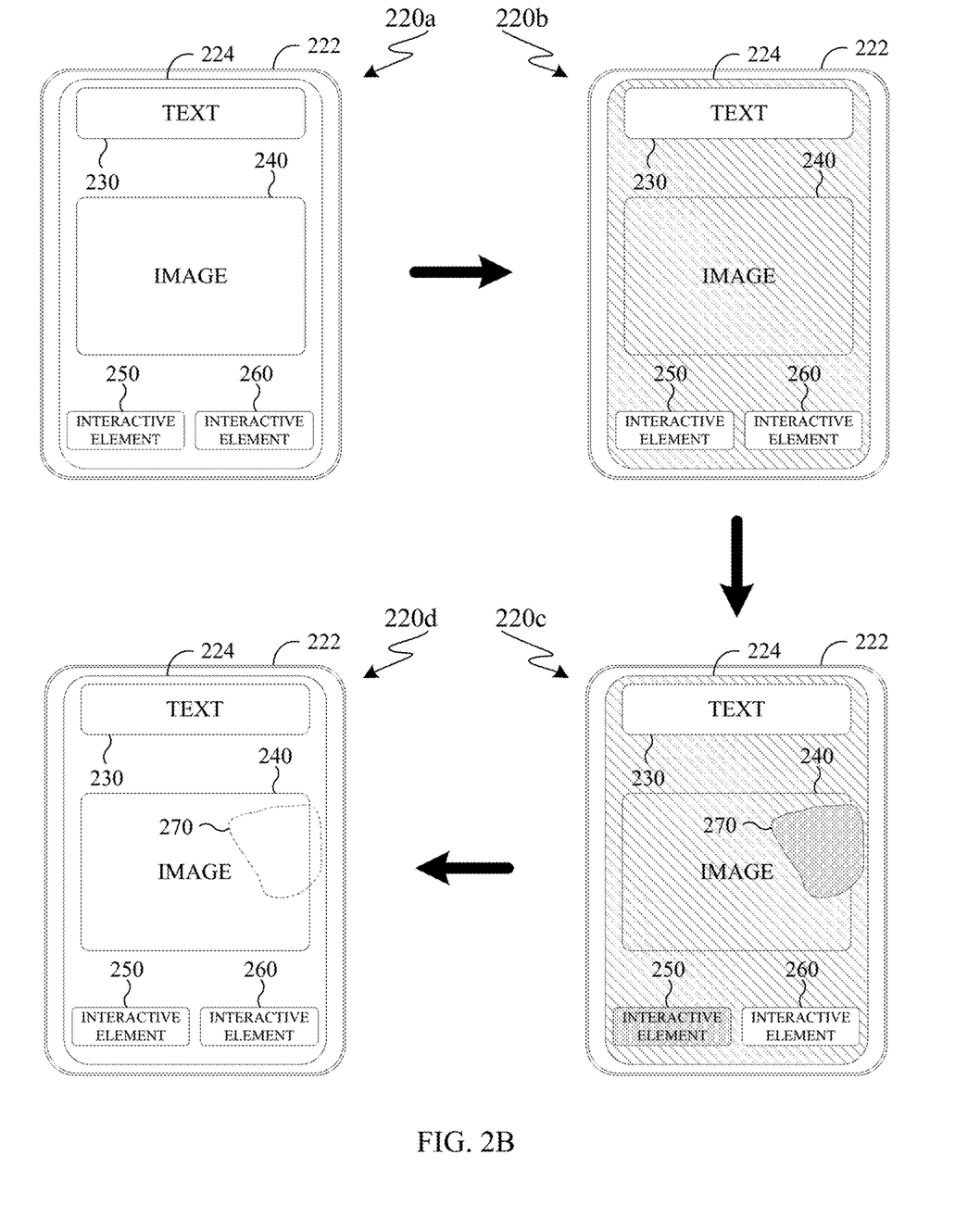
FIG. 2B illustrates an example user interface for associating an input mechanism representing a touch input with an interactive element in accordance with this disclosure.

FIG. 2A illustrates an example method 200 for associating an input mechanism representing a touch input with an interactive element in accordance with this disclosure. FIG. 2B illustrates an example user interface for associating an input mechanism representing a touch input with an interactive element in accordance with this disclosure. For ease of explanation, the method 200 of FIG. 2A and the user interface of FIG. 2B are described as being performed by or involving the use of the electronic device 101 shown in FIG. 1. However, the method 200 shown in FIG. 2A and the user interface of FIG. 2B could be used with any other suitable electronic device and in any other suitable system, such as when the method 200 is performed by the server 106.

As shown in FIG. 2A, in step 202, the electronic device 101 receives a request to associate an input mechanism with an interactive element. In some embodiments, the request is a predefined or other specified input with respect to an interactive element. For example, a user can initiate the request by performing a long input (such as a long finger press) on the interactive element. Also, in some embodiments, the electronic device 101 displays a menu after the request is received. The electronic device 101 can then receive an indication based on a received selection from the menu, such as a selection of a specified option in the menu. Based on the indication, the electronic device 101 can allow a user to designate one or more areas of the display 160 to receive an input that is associated with the interactive element.

In step 204, the electronic device 101 identifies possible touch areas of the display. The possible touch areas correspond to areas of the display 160 that can receive an additional touch input that will be mapped to the interactive element. For example, possible touch areas may correspond to regions of the display 160 that, when touched, will not interfere with other previously-established functions of the electronic device 101. As particular examples, to identify the possible touch areas of the display 160, the electronic device 101 may determine whether text (or a text region) is displayed on the display 160, and the electronic device 101 may exclude any portion of the display 160 that includes text (or a text region) from the possible touch areas. After determining that text is displayed within a region of the display 160, the electronic device 101 may determine whether the region corresponds to a text input or a text view. If the region has a predefined or other operation that is performed in response to receiving a touch input, the region corresponding to the text may be categorized as a text input and excluded from the possible touch areas of the display 160. If the region does not have a predefined or other operation that is performed in response to receiving a touch input, the region corresponding to the text may be categorized as a text view and included in the possible touch areas of the display 160.

Similarly, the electronic device 101 may determine whether an image is displayed on the display 160, and the electronic device 101 may exclude any area of the display 160 that includes an image with a predefined or other operation that is performed in response to receiving a touch input on the image. For instance, after determining that an image is displayed, the electronic device 101 may determine whether a predefined or other operation is to be performed after a touch input is received on the image. If the region has a predefined or other operation that is performed in response to receiving a touch input, the image may be excluded from the possible touch areas of the display 160. If the region does not have a predefined or other operation that is performed in response to receiving a touch input, the image may be included in the possible touch areas of the display 160.

Additionally, the electronic device 101 may determine whether one or more additional interactive elements are displayed on the display 160, and the electronic device 101 may exclude any area of the display 160 that includes any interactive element from the possible touch areas. The electronic device 101 may further identify one or more regions of the display 160 that are currently mapped to other interactive elements, and the electronic device 101 may exclude any area of the display 160 that is currently mapped to other interactive element from the possible touch areas. In some cases, the possible touch areas can include multiple areas or regions of the display 160 that are disjointed or non-continuous representing one or more different types of content, such as text input, an interactive element, or the like.

In step 206, the electronic device 101 distinguishes the possible touch areas from areas of the display that are not possible touch areas. For example, the electronic device 101 may cause the display 160 to change a color scheme (such as highlighting) in areas of the display 160 that include the possible touch areas. As another example, the electronic device 101 may cause the display 160 to change a color scheme (such as highlighting) in areas of the display 160 that do not include the possible touch areas. Changing the color scheme can provide an indication to the user as to the possible areas that can be mapped to the interactive element identified in step 202. In some embodiments, the electronic device 101 distinguishes the possible touch areas from areas of the display 160 that are not possible touch areas by preventing additional input within the areas of the display 160 that are identified as not possible touch areas.

In step 208, the electronic device 101 forms a designated area. For example, the electronic device 101 may receive an indication from the user at a location on the display 160 that is within the identified possible touch areas. The indication can correspond to a single pixel or a group of pixels. As a particular example, the received indication may correspond to a designated area of the display 160 that is identified by a user. As another example, the received indication can correspond to a predefined or other specified shape that is superimposed at a location on the display 160 as designated by a user input. The indication can also correspond to multiple disjointed areas on the display 160.

In step 210, the electronic device 101 maps the one or more designated areas to the interactive element associated with the request. At that point, once a future input is received within the designated area, the electronic device 101 performs an operation corresponding to the interactive element as if the input was received on the interactive element itself. In some embodiments, the electronic device 101 identifies the operation to be launched when the interactive element is selected. After identifying the operation, the electronic device 101 maps the designated area to the operation associated with the interactive element.

FIG. 2B illustrates an electronic device 222 (which may represent the electronic device 101 or other device) with a display 224 (which may represent the display 160 or other display). In some embodiments, the display 224 is a touchscreen that can both display content and receive touch inputs. As illustrated in FIG. 2B, the display 224 presents example user interfaces 220a-220d, where the user interfaces 220a-220d correspond to different steps of the method 200 shown in FIG. 2A. For example, the user interface 220a corresponds to step 202, the user interface 220b corresponds to step 206, and the user interface 220c corresponds to steps 208 and 210. The user interface 220d corresponds to a final result of the method 200. Note that the user interfaces 220a-220d here illustrate one specific example of creating and associating an input mechanism with an interactive element. Obviously, user interfaces can vary widely, and the results obtained using the approaches described in this disclosure can also vary widely depending on the circumstances.

As illustrated in FIG. 2B, each of the user interfaces 220a-220d includes a text region 230, an image 240, and interactive elements 250 and 260. In some embodiments, the text region 230 may represent a region of the display 224 where text is located and identified as a text view or text input region. The image 240 may represent a displayed image or graphic that may include a predefined or other operation that is performed when a touch input is received on the image 240. The interactive elements 250 and 260 represent "soft" buttons that are presented on the display 224.

When one of the interactive elements 250 and 260 is pressed or otherwise selected, the electronic device 222 can perform an operation that is associated with the corresponding interactive element. For example, the interactive element 250, when selected, may cause the electronic device 222 to launch a photo editing application for editing the image 240. As another example, the interactive element 260, when selected, may cause the electronic device 222 to launch a messaging application (such as a Short Messaging Service (SMS) application) for transmitting the image 240. Note that these applications are examples only and that any other applications may be associated with interactive elements.

After the electronic device 222 receives a predefined or other specified input with respect to the interactive element 250 of the user interface 220a, the electronic device 222 may display a menu providing different techniques for customizing an input that corresponds to the interactive element 250. In some embodiments, for example, the predefined or other specified input could be a long press and hold on the interactive element 250. The menu can specify one or more techniques for customizing an input mechanism that corresponds to the interactive element 250. For example, the input mechanisms may include a touch input, a voice input, or the like. In some embodiments, different predefined or other specified inputs can indicate the input type of the input mechanism to be used, such as when different inputs are associated with touch input, voice input, or the like.

When the predefined or other specified input that is associated with the interactive element 250 indicates that the input mechanism corresponds to a voice input, the electronic device 222 can prompt the user to verbally speak a voice command. Thereafter, the voice command (or information associated with the voice command) is saved in a memory, such as the memory 130 of FIG. 1, and mapped to the interactive element 250. When the electronic device 222 receives a voice input, the electronic device 222 can compare the received voice input to the voice command. When the received voice input matches or substantially matches the voice command, the electronic device 222 can perform the operation associated with the interactive element 250. Essentially, the electronic device 222 operates as if the user clicked or otherwise selected the interactive element 250 when the received voice input matches or substantially matches the voice command.

When the predefined or other specified input that is associated with the interactive element 250 indicates that the input mechanism corresponds to a touch input, the electronic device 222 displays the user interface 220b. In some embodiments, the electronic device 222 displays the user interface 220b after determining that a request for creating an input mechanism representing a touch input has been received. The user interface 220b indicates that the electronic device 222 has identified possible touch areas for receiving a future touch input. Possible touch areas for receiving the future touch input here can include areas of the display 224 that do not include text (such as the text region 230 when the text region 230 is identified as text input since a text input is excluded from the possible touch areas), an image with a predefined or other touch action, interactive elements (such as the interactive elements 250 and 260), and/or regions of the display 224 that are currently mapped to an interactive element. For example, if a GUI component includes text or an image that has a predefined or other operation that is performed when a touch input is received at the component, the GUI component may be excluded from the possible touch areas, regardless of whether the GUI component is text or an image. As illustrated here, the possible touch areas are gray (shaded), while the portions that are not possible touch areas are white (unshaded).

The electronic device 222 can receive one or more inputs within the possible touch areas. For example, the electronic device 222 may receive an indication within the possible touch areas to form a designated area 270. In some embodiments, the designated area 270 can be drawn by a stylus or finger of the user. In other embodiments, the designated area 270 can be a predefined or other specified shape that is presented on the display 224 and can be moved according to a received indication. Also, in some embodiments, the designated area 270 can include multiple disjointed (or non-connected) designated areas on the display 224.

As illustrated by the user interface 220c, the designated area 270 is mapped to the interactive element 250 based on the received request. For example, when a future input is received within the designated area 270, the electronic device 222 can launch an operation associated with the interactive element 250. Essentially, the electronic device 222 operates as if the user clicked or otherwise selected the interactive element 250 when the electronic device 222 receives an input in the designated area 270. Note that, in some embodiments, the designated area 270 is mapped to the operation associated with the interactive element 250 instead of the interactive element 250 itself. For example, the electronic device 222 can identify the operation that is to be performed when the interactive element 250 is selected. Thereafter, the electronic device 222 maps the designated area 270 to the identified operation that is to be performed when the interactive element 250 is selected such that the operation is launched when the designated area 270 (but not the interactive element 250 itself) is selected. In other embodiments, the electronic device 222 maps the designated area 270 to the identified operation that is to be performed when the interactive element 250 is selected such that the operation is launched when either the interactive element 250 or the designated area 270 is selected.

The display 224 can display the user interface 220d after the interactive element 250 is mapped to an input mechanism such as the designated area 270. In some embodiments, the designated area 270 is not displayed on the display 224. In other embodiments, the designated area 270 can be outlined as illustrated in the user interface 220d. In yet other embodiments, other mechanisms may be used to indicate the designated area 270.

In some embodiments, the interactive elements 250 and 260 are associated with different applications, and the mappings of the interactive elements to alternative input mechanisms can vary based on the application being executed or currently in focus on the display 224. For example, when a first application is being executed and displays the interactive element 250 on the display 224 (as illustrated in the user interface 220a), the interactive element 250 can be mapped to the designated area 270. When a second application is being executed and presents a second interactive element on the display 224 (possibly at the same location as the interactive element 250 illustrated in the user interface 220a), the second interactive element may not be mapped to the designated area 270. Here, the interactive element 250 and the second interactive element are associated with different applications and are therefore not mapped to the same designated area 270, even if the interactive elements are displayed at the same or similar locations. Of course, the method 200 can be performed to map the second interactive element to the same or similar location as the designated area 270. In some cases, the user may be given the option of copying the designated area 270 defined for one application to a different application.

Although FIG. 2A illustrates one example of a method 200 for associating an input mechanism representing a touch input with an interactive element, various changes may be made to FIG. 2A. For example, while shown as a series of steps, various steps in FIG. 2A may overlap, occur in parallel, occur in a different order, or occur any number of times. As another example, steps may be omitted or replaced by other steps. Also, various steps may be omitted or additional steps may be added as needed or desired.

Although FIG. 2B illustrates one example of a user interface for associating an input mechanism representing a touch input with an interactive element, various changes may be made to FIG. 2B. For example, FIG. 2B is merely meant to illustrate examples of the types of results that could be obtained using the approaches described in this disclosure. Contents and locations of the contents displayed on a user interface can vary widely, and the results obtained using the approaches described in this patent document can also vary widely depending on the circumstances. Also, while FIG. 2B illustrates associating a single input mechanism representing a touch input to a single interactive element, multiple input mechanisms can be associated with one or more interactive elements as needed or desired in any given circumstance.

Figure 3:
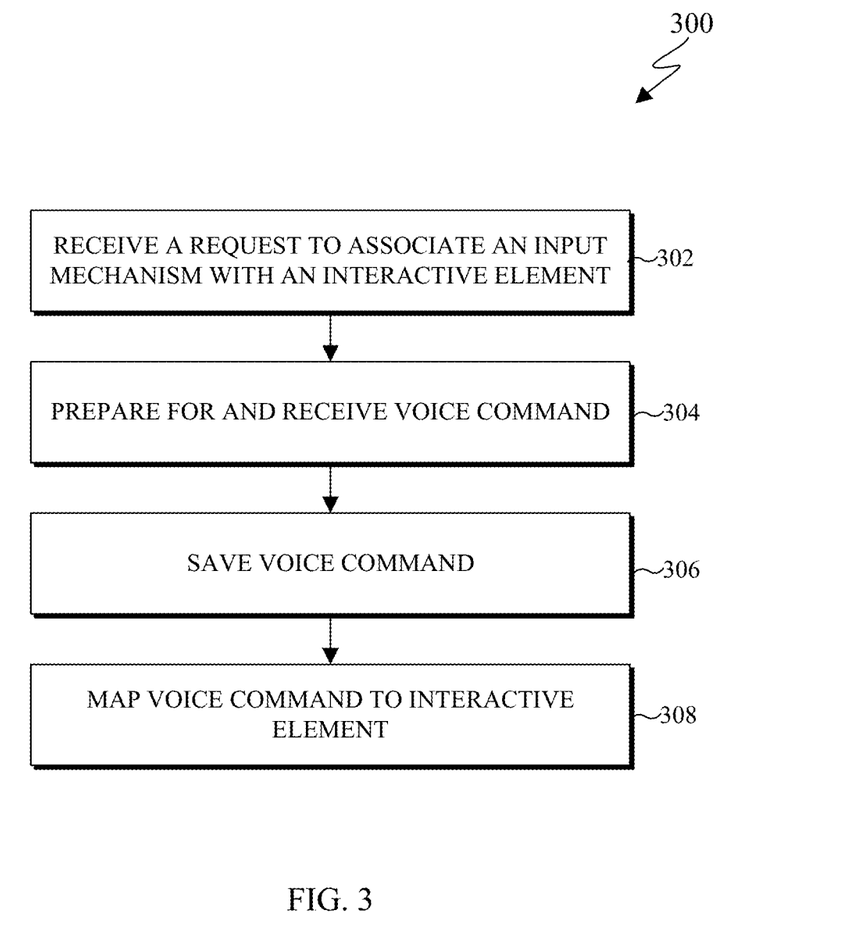
FIG. 3 illustrates an example process for associating an input mechanism representing a voice input with an interactive element in accordance with this disclosure.

FIG. 3 illustrates an example method 300 for associating an input mechanism representing a voice input with an interactive element in accordance with this disclosure. For ease of explanation, the method 300 of FIG. 3 is described as being performed by or involving the use of the electronic device 101 shown in FIG. 1. However, the method 300 shown in FIG. 3 could be used with any other suitable electronic device and in any other suitable system, such as when the method 300 is performed by the server 106.

As shown in FIG. 3, in step 302, the electronic device 101 receives a request to associate an input mechanism with an interactive element. For example, the request can cause the electronic device 101 to display a menu, and the electronic device 101 can receive an indication via the menu indicating that the input mechanism represents a voice input. Based on the indication, the electronic device 101 can allow a user to customize a voice command that is associated with the interactive element.

In step 304 the electronic device 101 prepares for and receives a voice command. For example, the electronic device 101 can prepare to receive a voice command after receiving an input from a user. As another example, the electronic device 101 can prepare to receive a voice command by prompting the user to verbally speak a voice command. In step 306, the electronic device 101 saves a received voice command (or information associated with the voice command) within a memory, such as the memory 130 of FIG. 1.

In step 308, the electronic device maps the voice command to the interactive element. For example, when the interactive element (such as the interactive element 250 or 260 of FIG. 2B) is displayed on the display 160, the electronic device 101 can be actively listening for a voice input. Upon receiving a voice input, the electronic device 101 determines whether the voice input matches or substantially matches the previously-recorded voice command. When the voice input matches or substantially matches the previously-recorded voice command, the electronic device 101 launches an operation associated with the corresponding interactive element.

In this way, the electronic device 101 can identify a particular operation that is launched when an interactive element is selected using a voice command. For example, the operation associated with an interactive element could be to play music if the interactive element is a play button for an audio application. As another example, the operation associated with an interactive element could be to reject or answer a phone call if the interactive element is associated with a phone application. When the interactive element is displayed on the display 160, the electronic device 101 can be actively listening for a voice input and compare received voice inputs to any previously-recorded voice commands. In some embodiments, when an interactive element is not displayed on the display 160, the electronic device 101 may not launch an operation even if a voice input that matches a previously-recorded voice command is received. The electronic device 101 can also remove or allow a user to modify or delete an existing voice command that is associated with an interactive element or an operation of an interactive element. For example, based on a received indication such as a predefined or other specified input, the electronic device 101 can display a menu allowing the user to modify or remove one or more existing voice commands.

Although FIG. 3 illustrates one example of a method 300 for associating an input mechanism representing a voice input with an interactive element, various changes may be made to FIG. 3. For example, while shown as a series of steps, various steps in FIG. 3 may overlap, occur in parallel, occur in a different order, or occur any number of times. As another example, various steps may be omitted or additional steps may be added as needed or desired.

Figure 4:
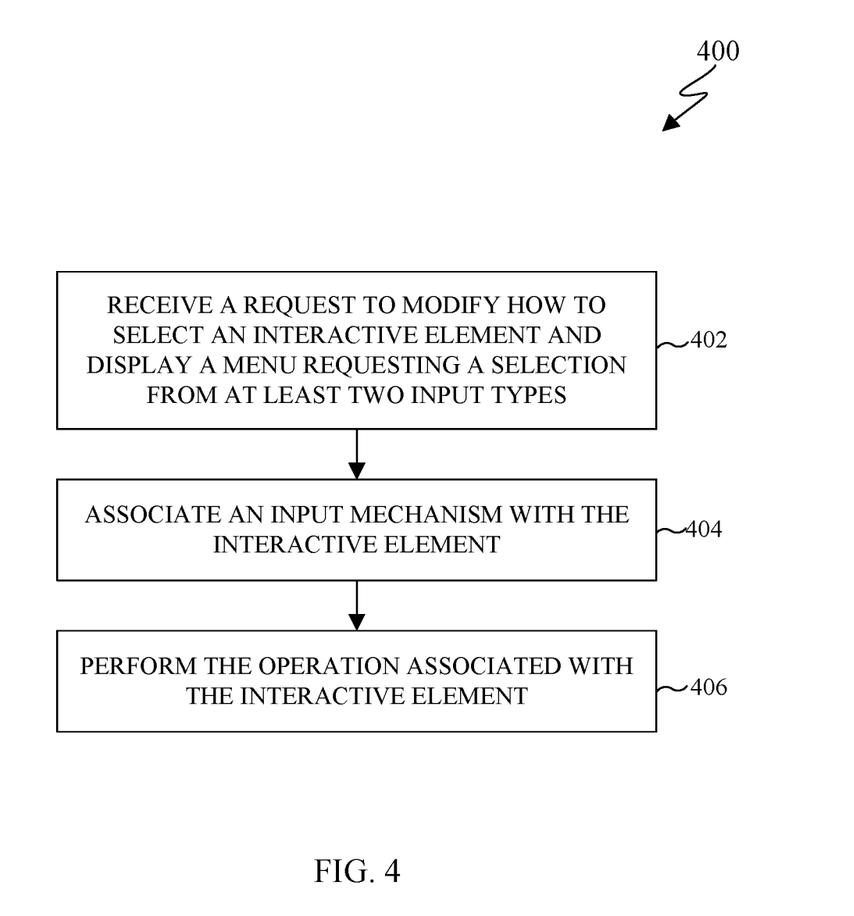
FIG. 4 illustrates an example process for associating an input mechanism with an interactive element in accordance with this disclosure.

FIG. 4 illustrates an example method 400 for associating an input mechanism with an interactive element in accordance with this disclosure. For ease of explanation, the method 400 of FIG. 4 is described as being performed by or involving the use of the electronic device 101 shown in FIG. 1. However, the method 400 shown in FIG. 4 could be used with any other suitable electronic device and in any other suitable system, such as when the method 400 is performed by the server 106.

As shown in FIG. 4, in step 402, the electronic device 101 receives a request to modify how an interactive element is selected. In some embodiments, the interactive element is a "soft" button presented at a location on the display 160 or a "hard" button that is located at a fixed position on the electronic device 101. When the interactive element is selected, such as by a user touching an area of the display 160 corresponding to a "soft" button or physically pressing a "hard" button, the interactive element launches an operation. For example, upon selecting an interactive element that is associated with an audio application and represented as a "play" button, the electronic device 101 may launch an operation that causes the audio application to start playing audio content, such as a song. As another example, upon selecting an interactive element that is associated with a camera application and represented as a "capture" button, the electronic device 101 may launch an operation that causes a camera to capture an image. As yet another example, upon selecting an interactive element that is associated with a settings menu of an application, the electronic device 101 may launch an operation that causes the display 160 to display additional configurable menu settings.

In some embodiments, the request to modify how an interactive element is selected is initiated in step 402 when a certain input is performed with respect to the interactive element. For example, a long touch can be performed on a "soft" button. After the certain input is received, a menu can be displayed on the display 160. The menu can inquire as to a specific type of input mechanism to be defined for the input mechanism. For instance, the menu may allow a user to select a specific type of input mechanism, such as a touch input, a voice command, or the like. If a single type of input mechanism is permitted (such as due to the design of the electronic device 101 or the specific interactive element), the use of the menu may be omitted.

In step 404, the electronic device 101 associates an input mechanism with the interactive element. The input mechanism represents another input for launching the operation associated with the interactive element without selecting the interactive element. For example, the input mechanism can be a voice input. To associate a voice input with the interactive element, the electronic device 101 can perform the method 300 described above. As another example, the input mechanism can be a touch input. To associate a touch input with the interactive element, the electronic device 101 can perform the method 200 described above.

Although FIG. 4 illustrates one example of a method 400 for associating an input mechanism with an interactive element, various changes may be made to FIG. 4. For example, while shown as a series of steps, various steps in FIG. 4 may overlap, occur in parallel, occur in a different order, or occur any number of times. As another example, various steps may be omitted or additional steps may be added as needed or desired.

Although the present disclosure has been described with reference to various example embodiments, various changes and modifications may be suggested to one skilled in the art. It is intended that the present disclosure encompass such changes and modifications as fall within the scope of the appended claims.

What is claimed is:

1. A method comprising:
   displaying an interactive element at a first location on a display of an electronic device, wherein the interactive element launches an operation associated with the interactive element on the electronic device upon a first input received on the interactive element;
   receiving a second input selecting the interactive element, the second input including a request to modify how the interactive element is selected to launch the operation associated with the interactive element on the electronic device;
   after the second input is received, requesting a selection from at least two input types;
   receiving an input mechanism for association with the interactive element, the input mechanism corresponding to one of the at least two input types;
   mapping the input mechanism to the interactive element for launching the operation based on the request; and
   performing the operation associated with the interactive element in response to receiving a third input that matches the input mechanism.

2. The method of claim 1, further comprising:
   determining that the selection indicates that the input mechanism is a voice input;
   mapping a voice command to the interactive element; and
   performing the operation associated with the interactive element in response to the input mechanism representing a future voice input that matches or is similar to the voice command being received.

3. The method of claim 1, further comprising:
   determining that the selection indicates that the input mechanism is a touch input;
   identifying one or more possible touch areas on the display for receiving a future touch input; and
   forming a designated area at a second location on the display from the one or more possible touch areas based on an indication that is received at the second location.

4. The method of claim 3, further comprising:
distinguishing the one or more possible touch areas on the display from other areas of the display;
receiving the indication at the second location, wherein the first location and the second location are located at different positions on the display;
mapping the designated area to the interactive element; and
performing the operation associated with the interactive element in response to the input mechanism representing the future touch input that is within the designated area being received.

5. The method of claim 3, wherein the designated area includes multiple disjointed areas.

6. The method of claim 3, wherein identifying the one or more possible touch areas comprises:
determining whether one or more additional interactive elements are displayed on the display;
in response to determining that the one or more additional interactive elements are displayed on the display, identifying one or more regions of the display that include the one or more additional interactive elements; and
excluding the one or more regions of the display from the one or more possible touch areas.

7. The method of claim 3, wherein identifying the one or more possible touch areas comprises:
identifying one or more regions of the display that are currently mapped to one or more interactive elements; and
excluding the one or more regions of the display that are currently mapped to any of the one or more interactive elements from the one or more possible touch areas.

8. An electronic device comprising:
a display configured to present an interactive element at a first location on a display of an electronic device, wherein the interactive element is configured to launch an operation associated with the interactive element on the electronic device upon a first input received on the interactive element; and
at least one processor operatively connected to the display, the at least one processor configured to:
receive a second input selecting the interactive element, the second input including a request to modify how the interactive element is selected to launch the operation associated with the interactive element on the electronic device;
after the second input is received, initiate requesting a selection from at least two input types;
receive an input mechanism for association with the interactive element, the input mechanism corresponding to one of the at least two input types;
map the input mechanism to the interactive element for launching the operation based on the request; and
perform the operation associated with the interactive element in response to receiving a third input that matches the input mechanism.

9. The electronic device of claim 8, wherein the at least one processor is further configured to:
determine that the selection indicates that the input mechanism is a voice input;
map a voice command to the interactive element; and
perform the operation associated with the interactive element in response to the input mechanism representing a future voice input that matches or is similar to the voice command being received.

10. The electronic device of claim 8, wherein the at least one processor is further configured to:
determine that the selection indicates that the input mechanism is a touch input;
identify one or more possible touch areas on the display for receiving a future touch input; and
form a designated area at a second location on the display from the one or more possible touch areas based on an indication that is received at the second location.

11. The electronic device of claim 10, wherein the at least one processor is further configured to:
distinguish the one or more possible touch areas on the display from other areas of the display;
receive the indication at the second location, wherein the first location and the second location are located at different positions on the display;
map the designated area to the interactive element; and
perform the operation associated with the interactive element in response to the input mechanism representing the future touch input that is within the designated area being received.

12. The electronic device of claim 10, wherein the designated area includes multiple disjointed areas.

13. The electronic device of claim 10, wherein, to identify the one or more possible touch areas, the at least one processor is configured to:
determine whether one or more additional interactive elements are displayed on the display;
in response to determining that the one or more additional interactive elements are displayed on the display, identify one or more regions of the display that include the one or more additional interactive elements; and
exclude the one or more regions of the display from the one or more possible touch areas.

14. The electronic device of claim 10, wherein, to identify the one or more possible touch areas, the at least one processor is configured to:
identify one or more regions of the display that are currently mapped to one or more interactive elements; and
exclude the one or more regions of the display that are currently mapped to any of the one or more interactive elements from the one or more possible touch areas.

15. A non-transitory machine-readable medium containing instructions that when executed cause at least one processor of an electronic device to:
display an interactive element at a first location on a display of an electronic device, wherein the interactive element is configured to launch an operation associated with the interactive element on the electronic device upon a first input received on the interactive element;
receive a second input selecting the interactive element, the second input including a request to modify how the interactive element is selected to launch the operation associated with the interactive element on the electronic device;
after the second input is received, initiate requesting a selection from at least two input types;
receive an input mechanism for association with the interactive element, the input mechanism corresponding to one of the at least two input types;
map the input mechanism to the interactive element for launching the operation based on the request; and
perform the operation associated with the interactive element in response to receiving a third input that matches the input mechanism.

16. The non-transitory machine-readable medium of claim 15, further containing instructions that when executed cause the at least one processor to:

determine that the selection indicates that the input mechanism is a voice input;

map a voice command to the interactive element; and perform the operation associated with the interactive element in response to the input mechanism representing a future voice input that matches or is similar to the voice command being received.

17. The non-transitory machine-readable medium of claim 15, further containing instructions that when executed cause the at least one processor to determine that the selection indicates that the input mechanism is a touch input;

identify one or more possible touch areas on the display for receiving a future touch input; and form a designated area at a second location on the display from the one or more possible touch areas based on an indication that is received at the second location.

18. The non-transitory machine-readable medium of claim 17, further containing instructions that when executed cause the at least one processor to:

distinguish the one or more possible touch areas on the display from other areas of the display;

receive the indication at the second location, wherein the first location and the second location are located at different positions on the display;

map the designated area to the interactive element; and perform the operation associated with the interactive element in response to the input mechanism representing the future touch input that is within the designated area being received.

19. The non-transitory machine-readable medium of claim 17, wherein the instructions that when executed cause the at least one processor to identify the one or more possible touch areas comprise instructions that when executed cause the at least one processor to:

determine whether one or more additional interactive elements are displayed on the display;

in response to determining that the one or more additional interactive elements are displayed on the display, identify one or more regions of the display that include the one or more additional interactive elements; and exclude the one or more regions of the display from the one or more possible touch areas.

20. The non-transitory machine-readable medium of claim 17, wherein the instructions that when executed cause the at least one processor to identify the one or more possible touch areas comprise instructions that when executed cause the at least one processor to:

identify one or more regions of the display that are currently mapped to one or more interactive elements; and exclude the one or more regions of the display that are currently mapped to any of the one or more interactive elements from the one or more possible touch areas.

* * * * *